(12) United States Patent
Kamijo et al.

(10) Patent No.: US 7,283,820 B2
(45) Date of Patent: Oct. 16, 2007

(54) SECURE COMMUNICATION OVER A MEDIUM WHICH INCLUDES A POTENTIALLY INSECURE COMMUNICATION LINK

(75) Inventors: Noboru Kamijo, Fujisawa (JP); Toru Aihara, Yokohama (JP); Kazumasa Ochiai, Kawasaki (JP)

(73) Assignee: Lenovo Singapore Pte. Ltd., Singapore (SG)

( * ) Notice: Subject to any disclaimer, the term of this patent is extended or adjusted under 35 U.S.C. 154(b) by 323 days.

(21) Appl. No.: 11/196,896

(22) Filed: Aug. 4, 2005

(65) Prior Publication Data

US 2006/0068785 A1   Mar. 30, 2006

(30) Foreign Application Priority Data

Aug. 4, 2004   (JP) .............................. 2004-228412

(51) Int. Cl.
*H04Q 7/20* (2006.01)
*H04M 1/68* (2006.01)

(52) U.S. Cl. .................. 455/435.1; 455/411; 455/410; 455/406; 455/41.2; 379/189; 379/161

(58) Field of Classification Search ............. 455/435.1, 455/410, 411, 406–408, 41.2, 418; 379/189, 379/161; 726/1–36; 380/247–250
See application file for complete search history.

(56) References Cited

U.S. PATENT DOCUMENTS

2002/0037708 A1* 3/2002 McCann et al. ............ 455/411
2005/0208926 A1* 9/2005 Hamada ..................... 455/410
2006/0019653 A1* 1/2006 Stamoulis et al. .......... 455/425

FOREIGN PATENT DOCUMENTS

JP   2003-235082       8/2003
NL   1007409 C6  *   11/1997

* cited by examiner

Primary Examiner—Joseph Feild
Assistant Examiner—S. Smith
(74) Attorney, Agent, or Firm—Carlos Munoz-Bustam

(57) ABSTRACT

In an information processing system, a mobile phone obtains a setting program which makes security settings for ensuring security of communication by performing authentication with a communication destination on an unsecured communication link, from a registration server through a secure, first communication link; an information processing device executes the setting program obtained from the mobile phone to make security settings, communicates with a relay server through an unsecured, second communication link; the registration server receives access from the mobile phone through the first communication link, authenticates a user, and sends the setting program to the mobile phone; the relay server authenticates an information processing device in response to a connection request from the information processing device, makes security settings, and relays access from the information processing device to a communication network through the second communication link.

13 Claims, 13 Drawing Sheets

[Figure 1]
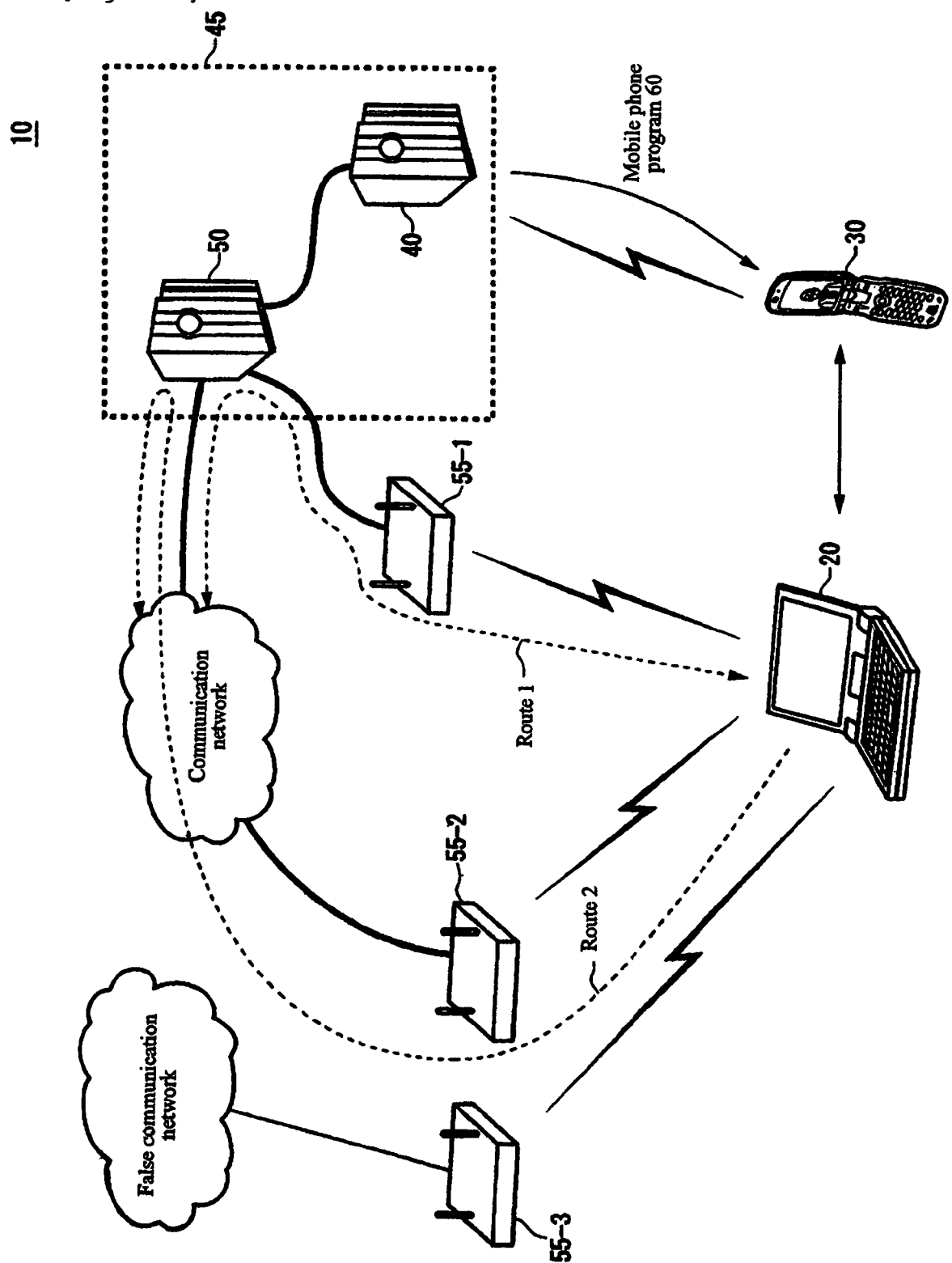

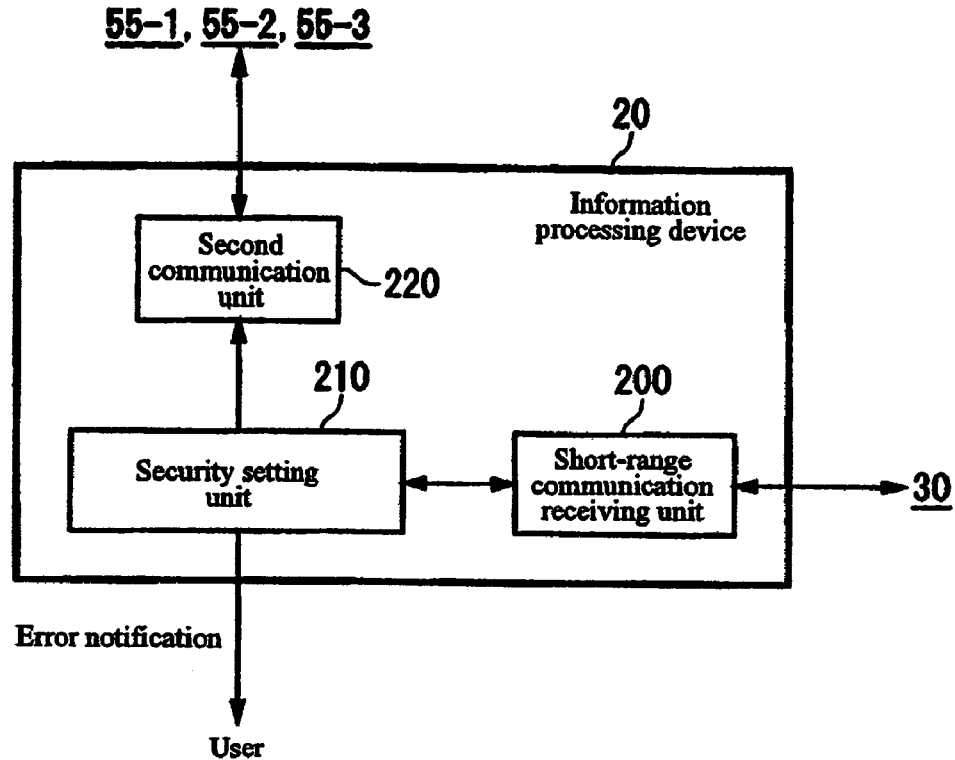
[Figure 2]
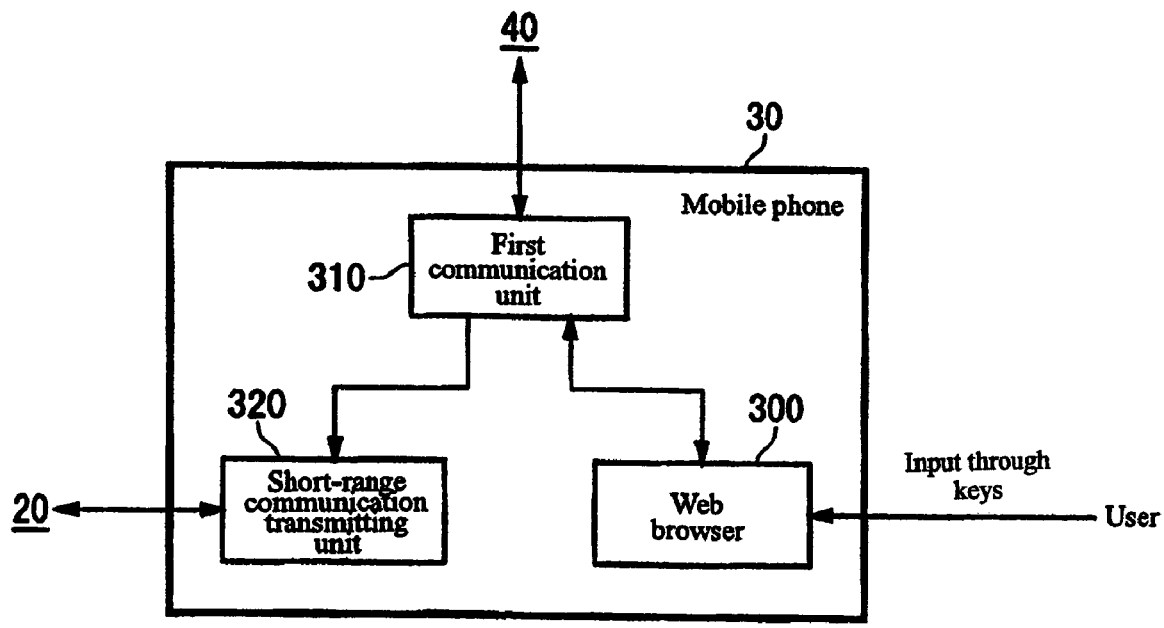
[Figure 3]

[Figure 4]
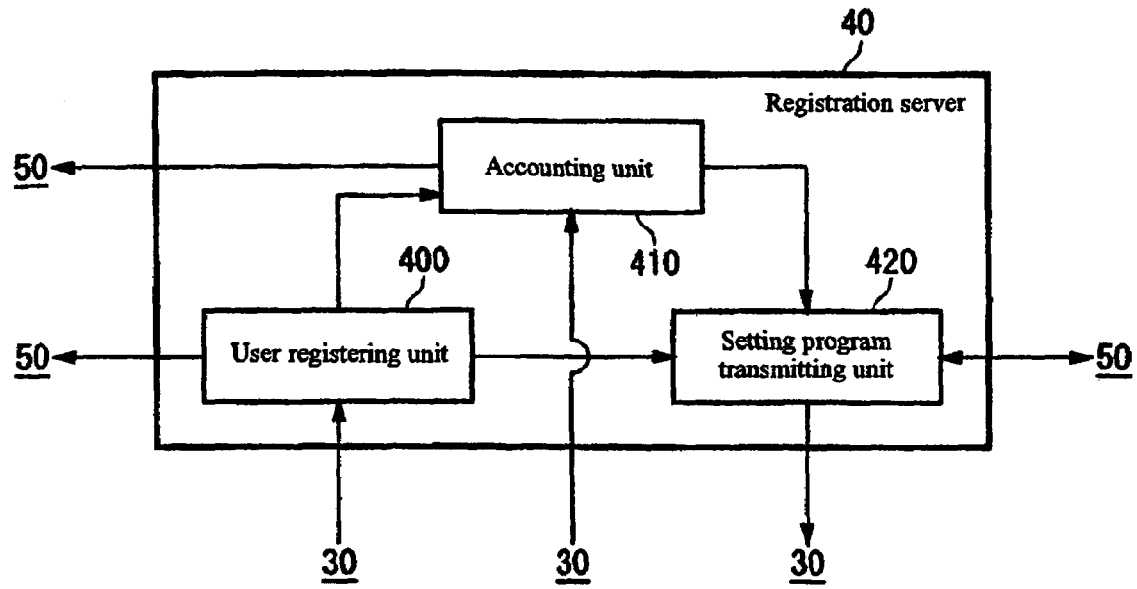
[Figure 5]
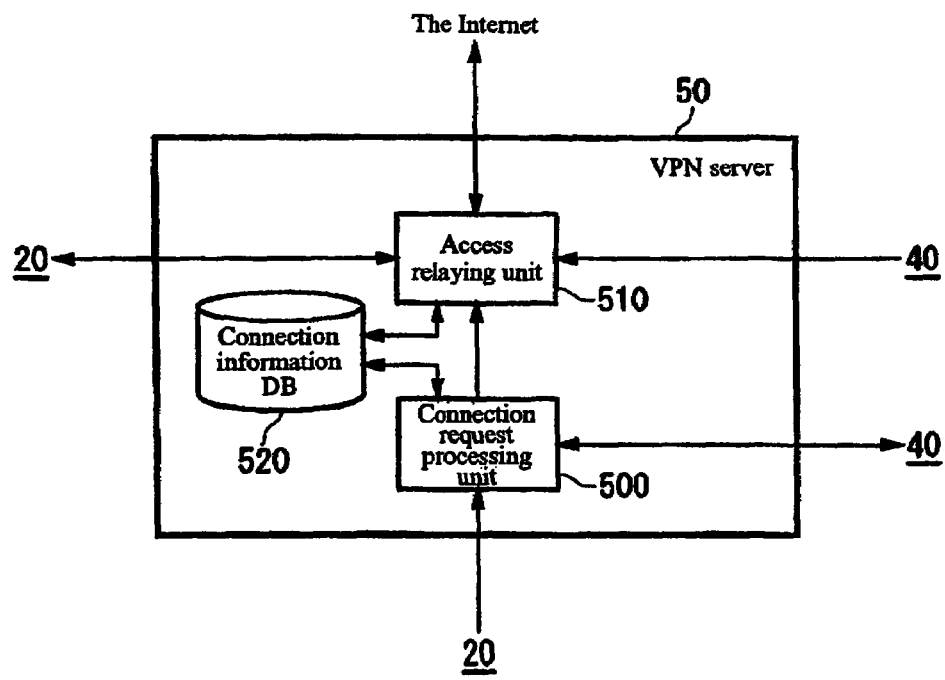

[Figure 6]

| Authorized user ID | Authentication information | Group ID | Connection time | Approved connection time |
|---|---|---|---|---|
| AAA | XabcYa | 1 | 1:23:45 | 5:00:00 |
| AAB | XcdYda | 1 | 6:55:45 | 10:00:00 |
| ABA | ZabXcd | 2 | 2:00:05 | 5:00:00 |
| ABB | Xcabdc | 2 | 1:45:35 | 5:00:00 |
| BBB | AXcXcd | 2 | 3:15:12 | 5:00:00 |
| ⋮ | ⋮ | ⋮ | ⋮ | ⋮ |

520

[Figure 7]
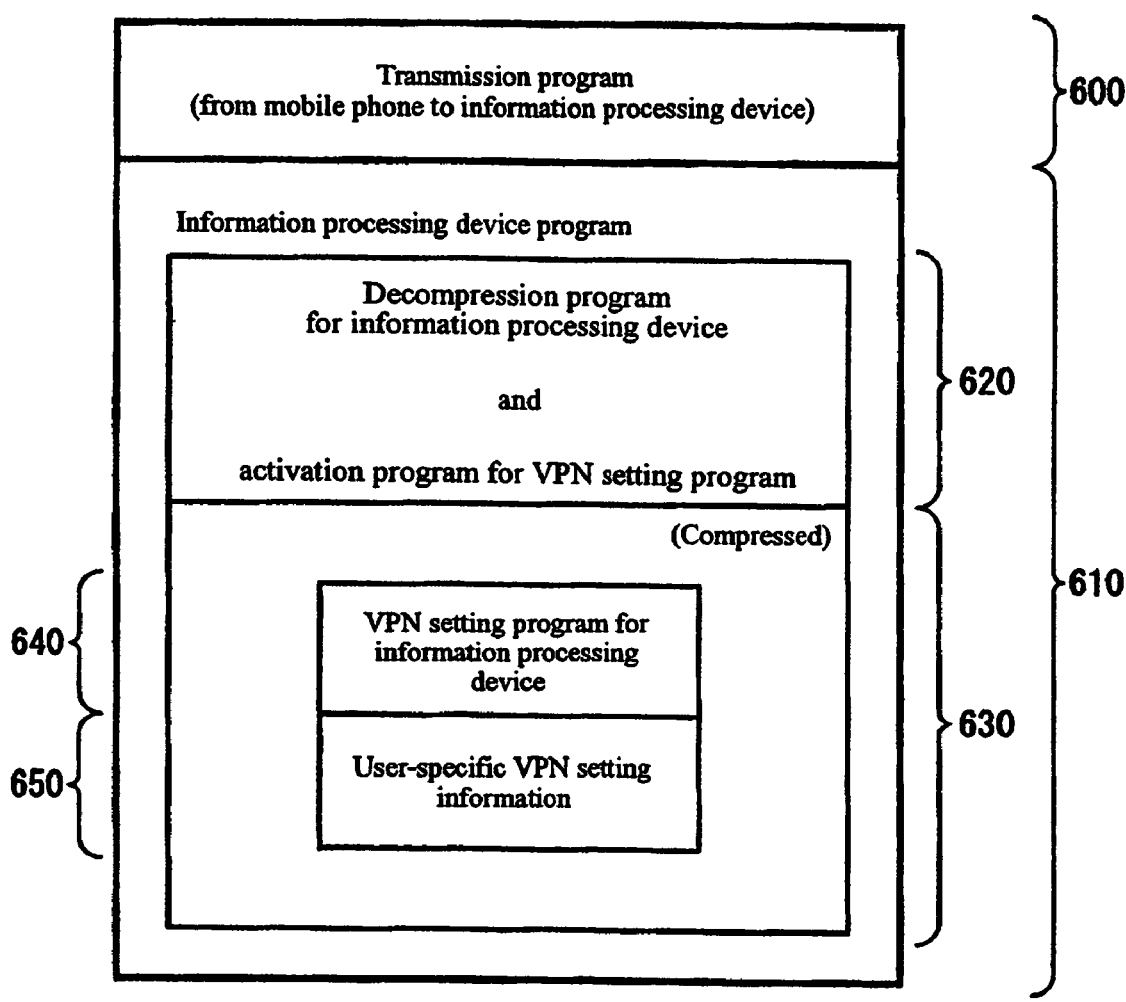

[Figure 8]
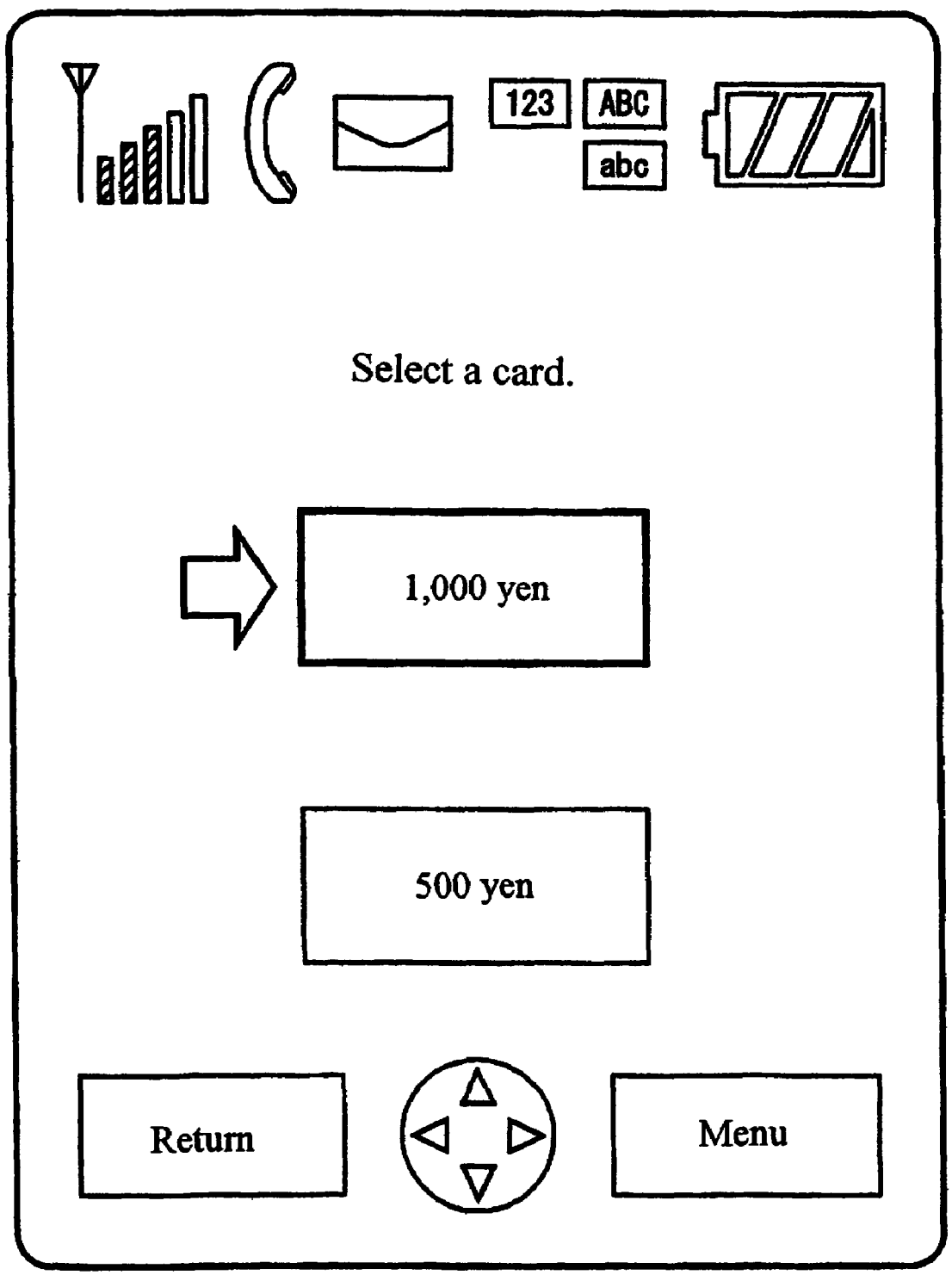

[Figure 9]
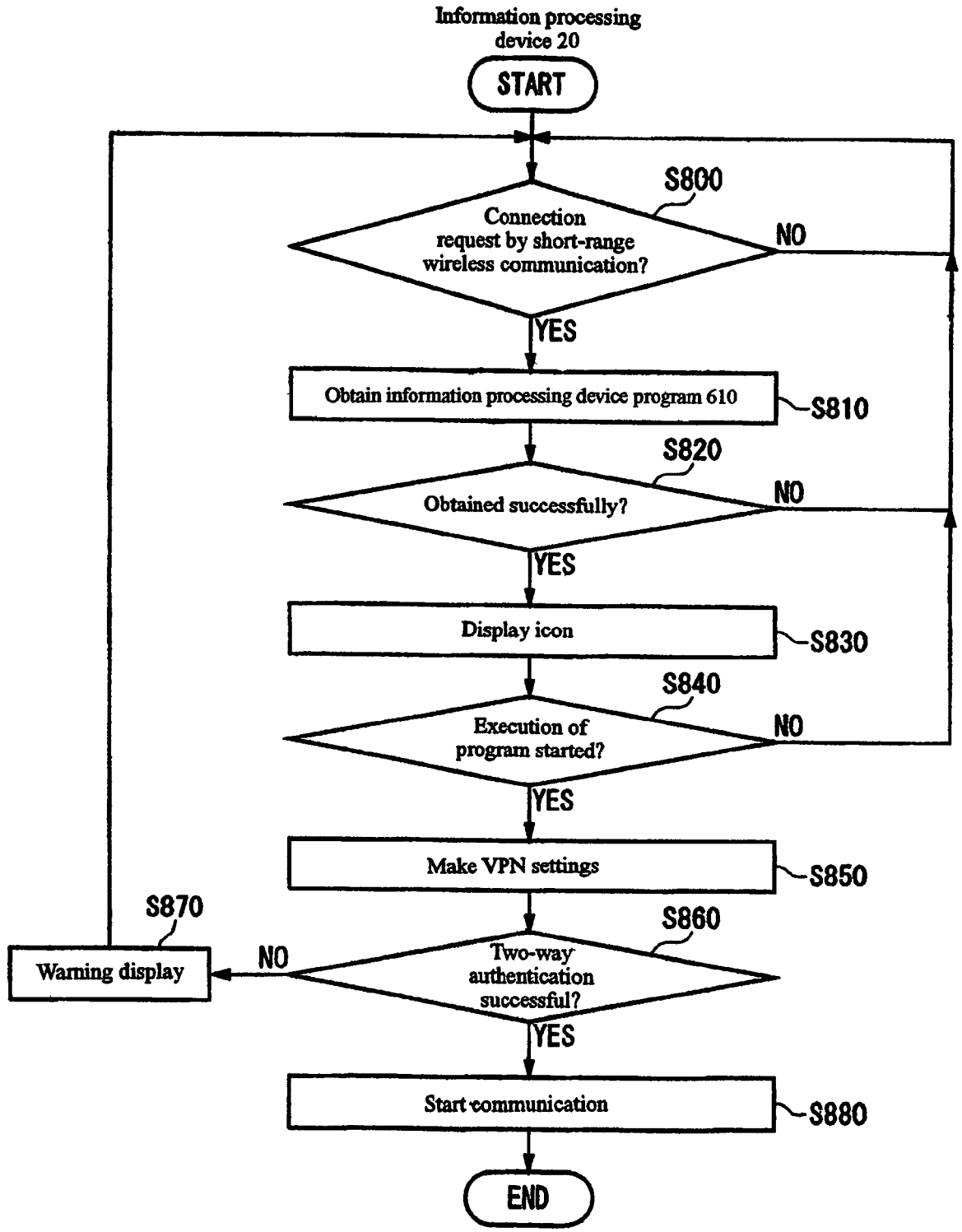

[Figure 10]
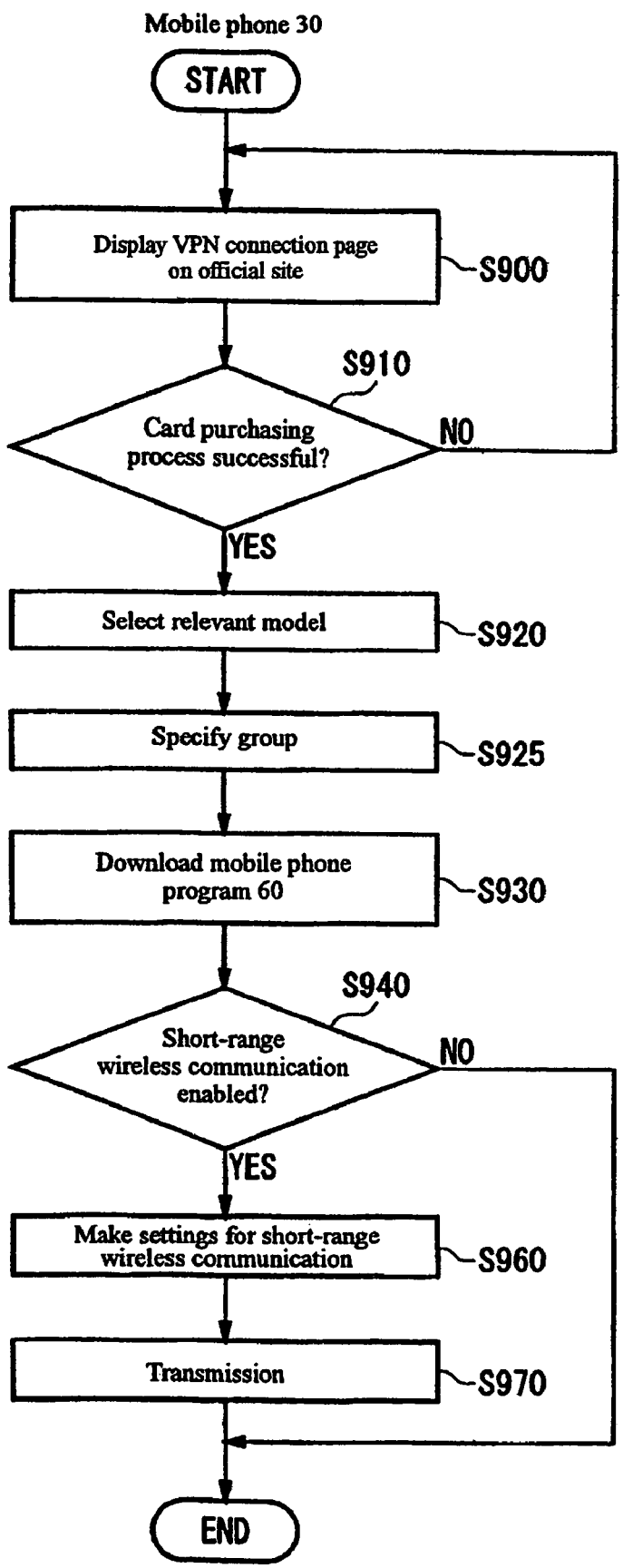

[Figure 11]
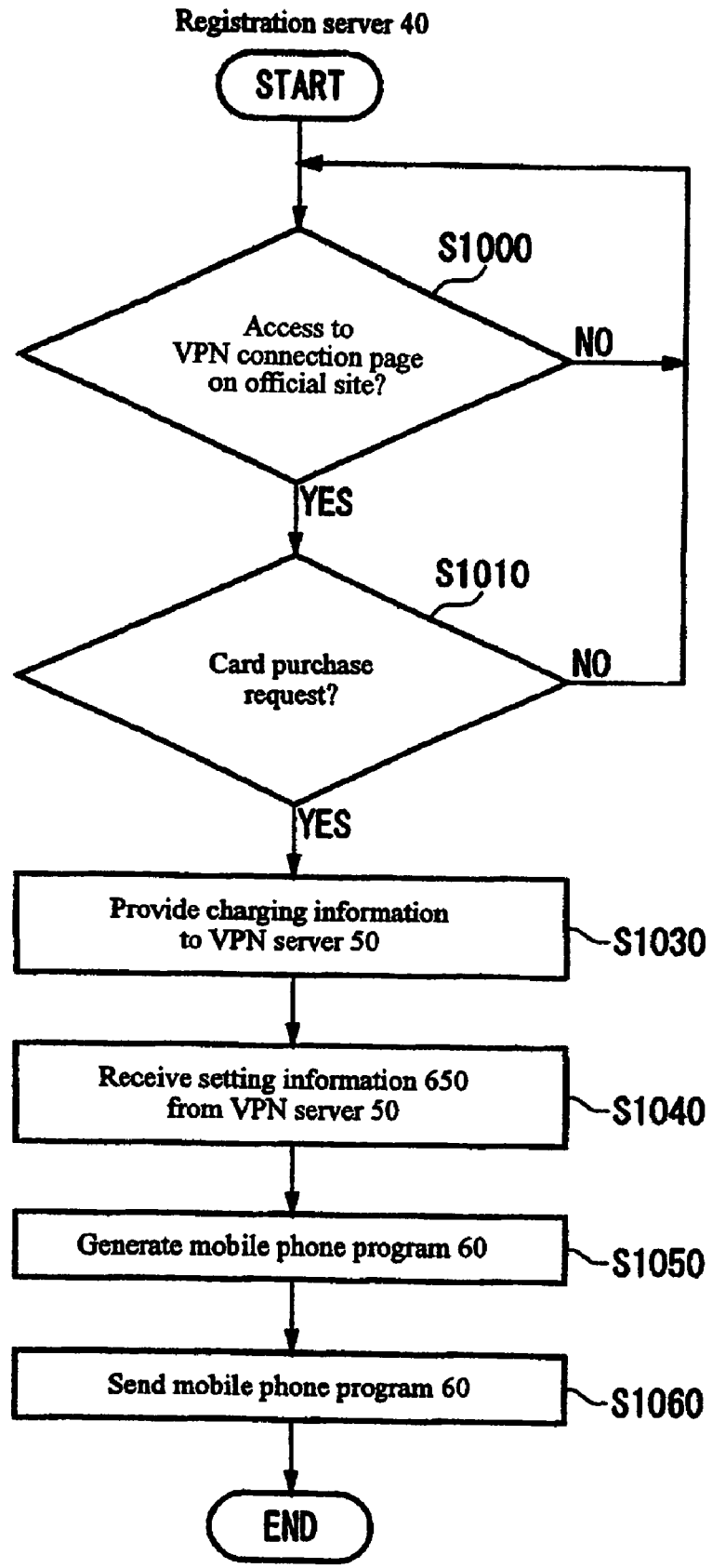

[Figure 12]
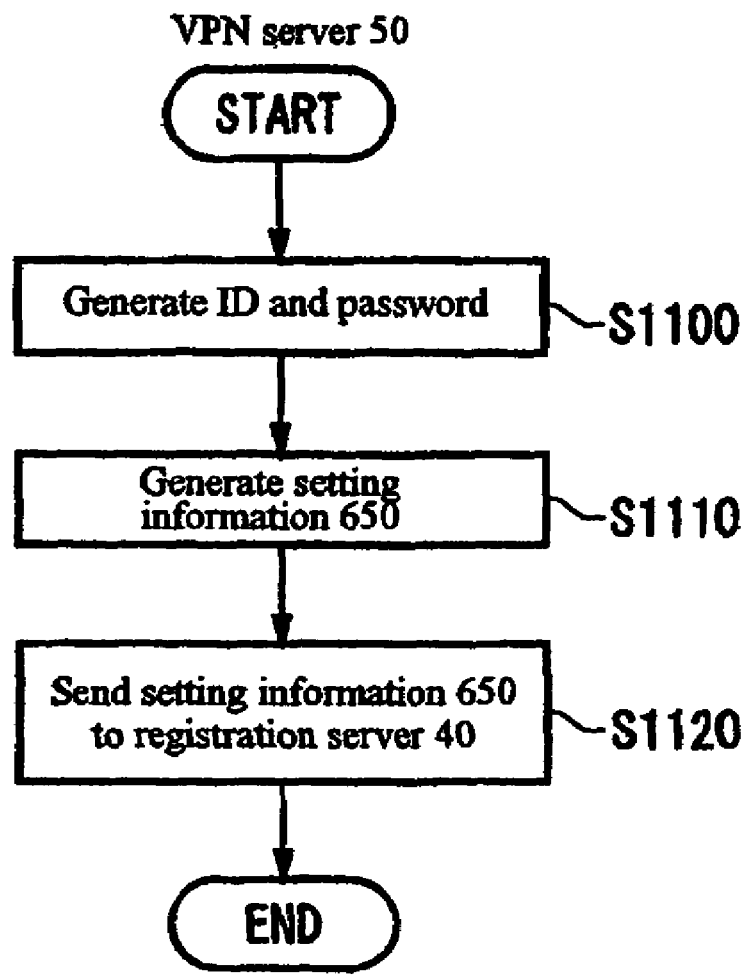

[Figure 13]
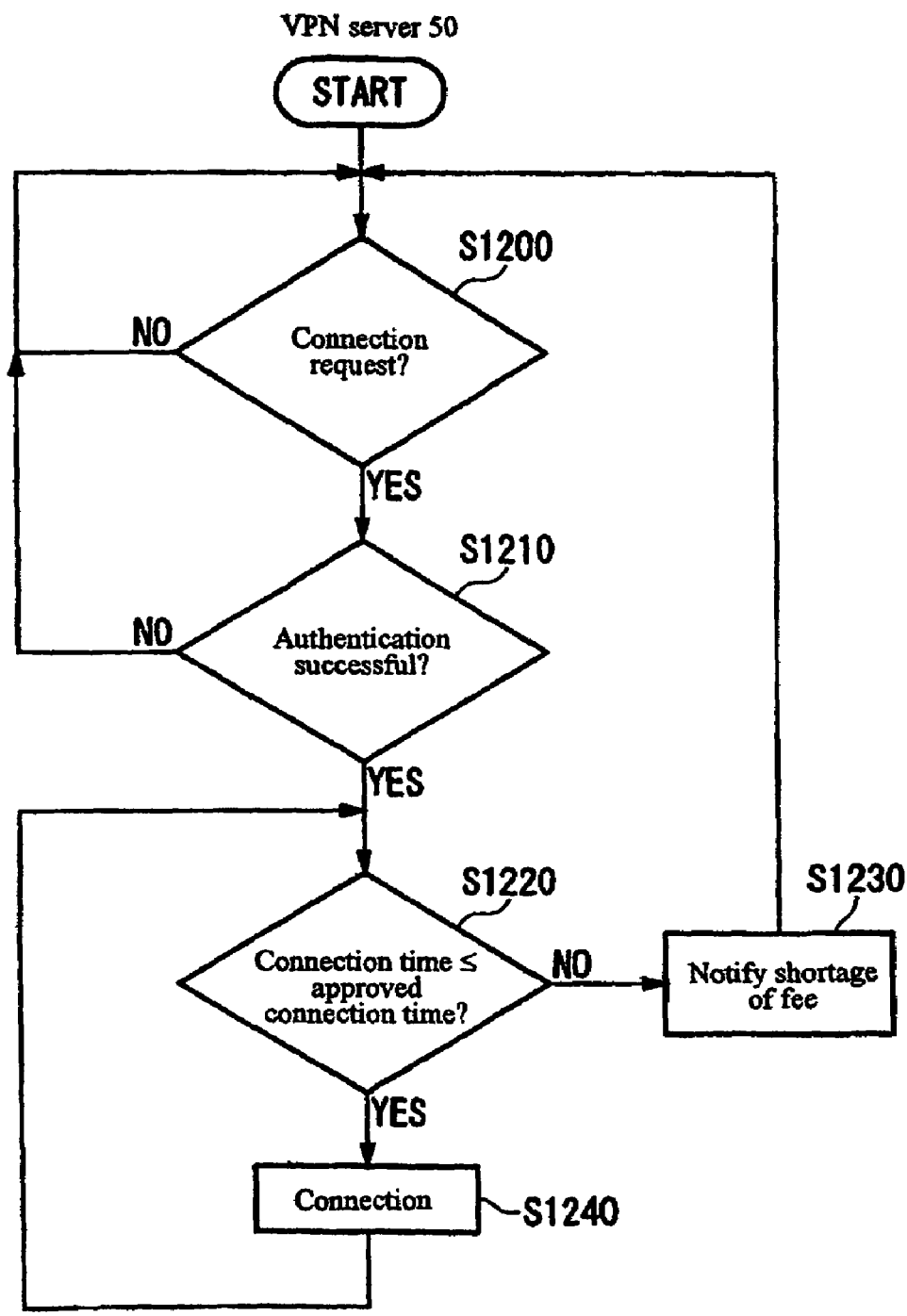

[Figure 14]
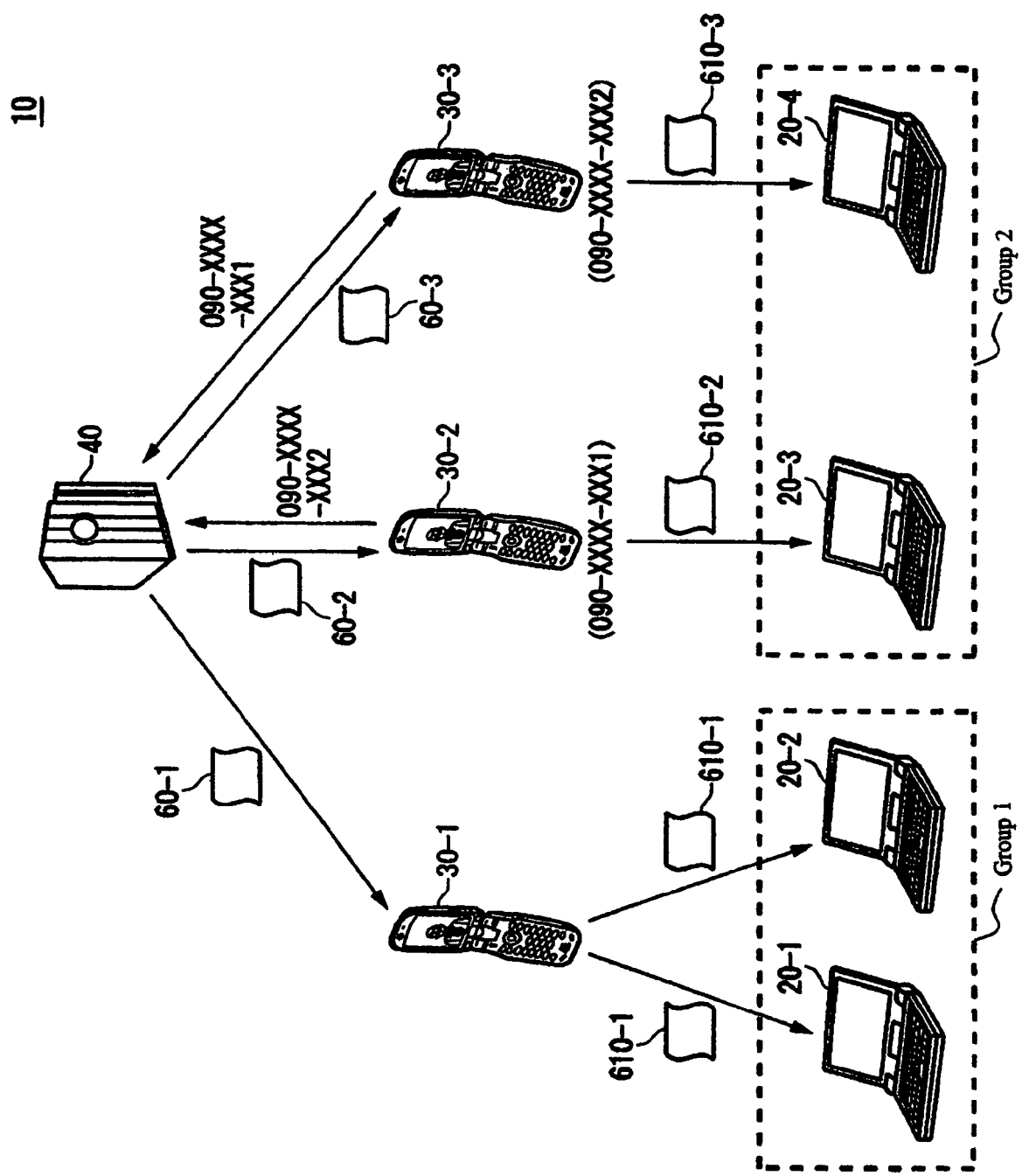

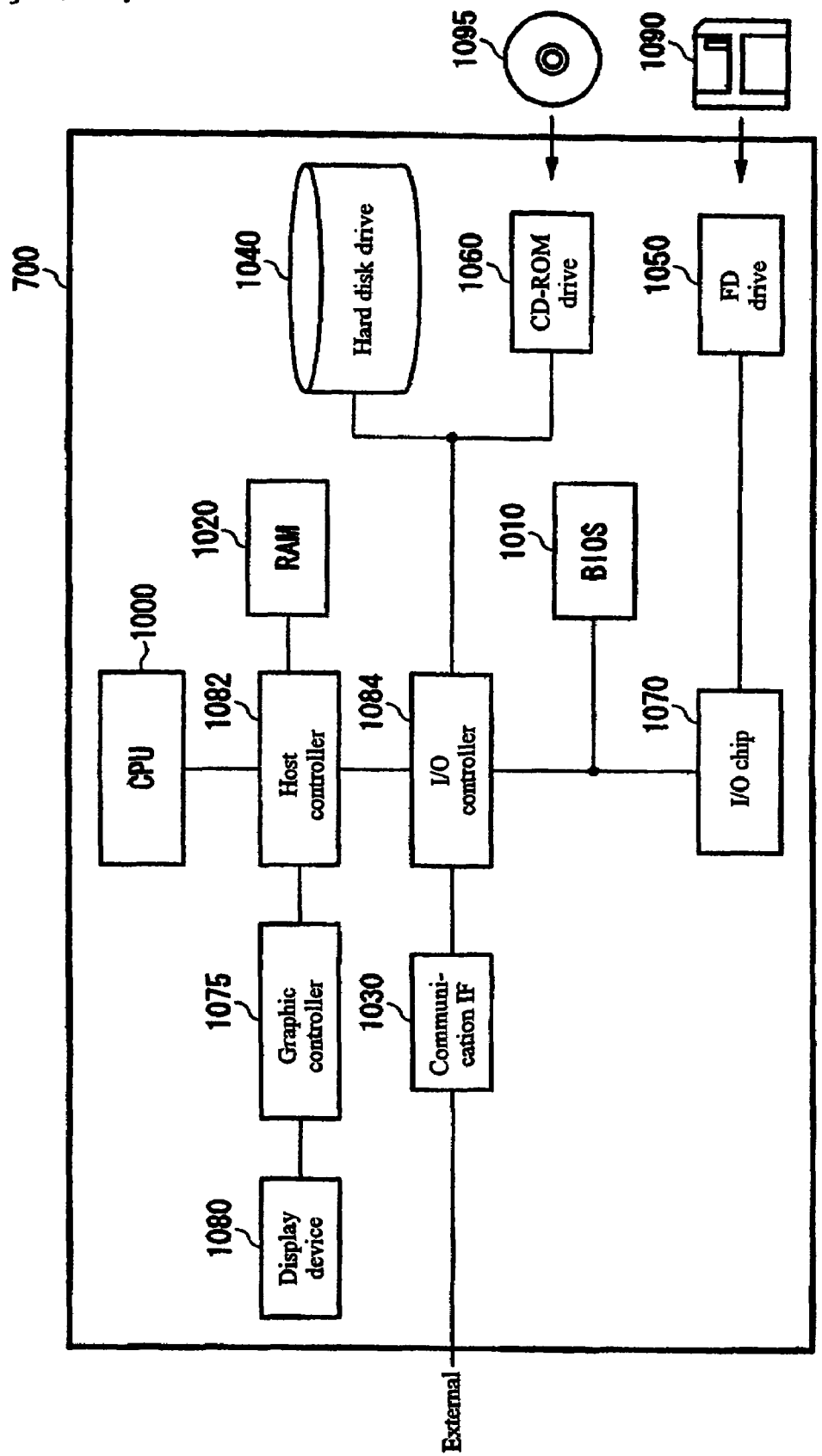
[Figure 15]

SECURE COMMUNICATION OVER A MEDIUM WHICH INCLUDES A POTENTIALLY INSECURE COMMUNICATION LINK

The present invention relates to an information processing system, a communication method, a program product, and an access relaying service system and, in particular, to an information processing system, a communication method, a program product, and an access relaying service system for performing secure communication over a potentially unsecured communication link.

BACKGROUND

Along with the rapid proliferation of wireless LANs in recent years, wireless LAN access points are being provided at railroad stations, airports, hotels, coffee shops, fast-food places, and other public places. To use such an access point, a user typically must make registration for arranging terms and conditions concerning communication charge payment and the like. Then, the user can use the access point by inputting through a terminal device an ESSID (Extended Service Set Identifier) and a WEP (Wired Equivalent Privacy) key obtained through the user registration.

A technique has been proposed in which a mobile phone is used to perform registration for using a wireless LAN access point (see Patent Document 1). According to the technique, a user first enters, through his/her mobile phone, information such as the MAC address of a communication device that will communicate with the wireless LAN access point. A gateway server, which mediates between the wireless LAN access point and a network such as the Internet, performs a registration process according to the entered information and permits access of the registered communication device to the Internet. The technique has the advantages that it is convenient because it saves the user from having to fill in and send a registration form by conventional mail and the service can be used online immediately after the registration.

The Yahoo BB! mobile service uses a technique in which when a user makes a call to a specified number from a mobile phone, an ESSID and a WEP key are issued on the basis of information such as the caller telephone number indicated to a device at the called site. The ESSID and WEP key issued are notified to the user by voice. The user enters the notified ESSID and WEP key into a communication terminal to connect to the Internet. A guideline for the security of wireless LANs will be described later (see Non-Patent Document 1).

[Patent Document 1] Published Unexamined Patent Application No. 2003-235082

[Non-Patent Document 1] Web Page URL "http://it.jeita.or.jp/perinfo/committee/pc/wirelessLAN/"

SUMMARY of the INVENTION

According to the technique proposed in Patent Document 1, a user must key in an MAC address, which consists of as many as 12 alphanumeric characters on the mobile phone. This is troublesome to the user and is prone to error. With the Yahoo BB! mobile service, a user must catch 10 alphanumeric characters on the mobile phone. Some alphanumeric characters have similar pronunciations. If the speech quality of the mobile phone communication is poor, users can often mishear or miss the IDs or keys.

Even if a user can successfully reach a wireless LAN access point, there is another problem: vulnerability of the security system with WEP keys and SSID has been pointed out, and more robust security is desired. For example, Japan Electronics and Information Technology Industries Association (JEITA) has proposed a guideline on technology for improving the security of wireless LANs (see Non-Patent Document 1). Moreover, a malicious user can illegally set a wireless LAN access point in a public place and intercept information transmitted by another user. There can be another computer crime in which a malicious user sets a server disguised as an access point to which a user wants to connect and steals information (MAN-IN-THE-MIDDLE). To ensure security with a more robust system such as IPSec and PPTP, users must perform more complicated operations.

A purpose of the present invention is to provide an information processing system, a communication method, a program product, and an access relaying service system that can solve the problems. The purpose is achieved by a combination of features set forth in the independent claims. The dependent claims define further specific embodiments.

To solve these problems, in a first aspect of the present invention, there are provided an information processing system, a communication method and program using the information processing system, a recording medium on which the program is recorded, and an access relaying service system included in the information processing system, wherein the information processing system includes a mobile phone, an information processing device, a relay server which relays access from the information processing device to a communication network, and a registration server which registers a user who uses the relay server, according to an instruction from the mobile phone, the mobile phone including: a first communication unit which accesses the registration server through a first communication link which is a secured communication link and obtains from the registration server a setting program which performs authentication with a communication destination on a potentially unsecured communication link and makes security settings for ensuring security of communication; and a short-range communication transmitting unit which sends the setting program to the information processing device by short-range communication; the information processing device including: a short-range communication receiving unit which obtains the setting program from the mobile phone; a security setting unit which executes the setting program to perform authentication with the relay server through a second communication link which is a potentially unsecured communication link and to make the security settings; and second communication unit which communicates with the relay server through the second communication link to connect to the communication network if the security settings are made; the registration server including: a user registering unit which registers, on the basis of access from the mobile phone, an authorized user authorized to be relayed by the relay server; and a setting program transmitting unit which sends to the mobile phone the setting program for the authorized user to make the security settings on the information processing device; and the relay server includes: a connection request processing unit which makes the security settings, provided that a connection request from the information processing device is received through the second communication link and that the user of the information processing device is authenticated as the authorized user; and an access relaying unit which relays access from the information processing device to the communication network if the security settings are made.

The summary of the invention provided above does not enumerate all essential features of the present invention. Subcombinations of the features also can constitute the present invention.

Secure, simple and easy connection to a communication network can be established and leakage and tampering of information can be prevented by detecting a false communication network or server.

BRIEF DESCRIPTION of the DRAWINGS

FIG. 1 shows a configuration of an information processing system 10;

FIG. 2 shows a configuration of an information processing device 20;

FIG. 3 shows a configuration of a mobile phone 30;

FIG. 4 shows a configuration of a registration server 40;

FIG. 5 shows a configuration of a VPN server 50;

FIG. 6 shows an exemplary data structure of a connection information database 520;

FIG. 7 shows a specific example of a mobile phone program 60;

FIG. 8 shows an example of a display presented on the display screen of a mobile phone 30;

FIG. 9 shows an example of a process performed on an information processing device 20 for starting communication with the VPN server 50;

FIG. 10 shows an example of a process performed on a mobile phone 30 for obtaining a mobile phone program 60 and sending it to an information processing device 20;

FIG. 11 shows an example of a process performed on the registration server 40 for sending a mobile phone program 60 to a mobile phone 30;

FIG. 12 shows an example of a process performed on the VPN server 50 for sending a mobile phone program 60 to the registration server 40 in response to notification form the registration server 40;

FIG. 13 shows an example of a process performed on the VPN server 50 for relaying access from an information processing device 20 to a communication network;

FIG. 14 illustrates a concept of grouping of information processing devices; and FIG. 15 shows an exemplary hardware configuration of a computer 700 that functions as the registration server 40.

DETAILED DESCRIPTION of the PREFERRED EMBODIMENTS

While the present invention will be described below with respect to embodiments thereof, the embodiments are not intended to limit the present invention which is defined in the claims and not all of the combinations of features described in the embodiments are essential to the inventive solution.

FIG. 1 shows a configuration of an information processing system 10. The information processing system 10 includes an information processing device 20, a mobile phone 30, an access relaying service system 45, and a wireless LAN access point 55-1. The mobile phone 30 can be managed or used by the same user as that of the information processing device 20. A purpose for the information processing system 10 in the present embodiment is to ensure the security of access from an information processing device 20 of the user by passing the access through the access relaying service system 45 to allow the user to access a proper communication network. In the following description, such a user is called a relay requesting user.

The access relaying service system 45 includes a VPN (Virtual Private Network) server 50, which is an example of a relay server for relaying access from an information processing device 20 to a communication network, and a registration server 40 for registering a user who wants to use the VPN server 50 according to an instruction from a mobile phone 30. When the registration server 40 receives access from a mobile phone 30 of a relay requesting user through a first communication link secured by a mobile communications provider, the registration server 40 authenticates the relay requesting user.

The communication network may be the Internet. The first communication link may be a communication link that connects to the Internet through a mobile phone link. The registration server 40 may authenticate the relay requesting user on the basis of the caller telephone number of the mobile phone 30. The registration server 40 registers, on the basis of the access from the mobile phone 30, the user who is authorized to be relayed by the VPN server 50. The registration server 40 may use a charging mechanism that charges a fee for communication by the mobile phone 30 to charge for the connection, according to the connection time during which the relay requesting user wants to access the communication network.

After the completion of registration of the authorized user, the registration server 40 sends a setting program for making settings for ensuring the security of communication over an unsecured communication link, a connection program 630 for example, for making settings for participating a VPN (Virtual Private Network), to the mobile phone 30. Preferably, the connection program 630 is embedded in and sent with a mobile phone program 60 that is executable on a mobile phone and is automatically executed when downloaded to the mobile phone. Then, the mobile phone 30 executes the received mobile phone program 60 to send the connection program 630 to the information processing device 20 by a short-range wireless communication.

The information processing device 20 executes the connection program 630 to make settings for performing authentication with the VPN server 50 and joining the VNP. The information processing device 20 then communicates with the VPN server 50 through a second, unsecured communication link which passes through the wireless LAN access point 55-1. If the VPN server 50 successfully authenticates the information processing device 20, the VPN server 50 ensures the security of the access from the information processing device 20 before relaying the access to the communication network. The wireless LAN access point 55-1, which may be a free access point provided in a public place (hereinafter referred to as a hotspot), connects the information processing device 20 to the VPN server 50 by wireless communication with the information processing device 20. As a result, connection to the communication network is established through the route 1 indicated by the dashed line in FIG. 1.

In this way, the information processing device 20 uses the mobile phone to obtain the connection program 630 which makes settings for ensuring the security of communication over the unsecured communication link. That is, another purpose for the information processing system 10 is, by using this, to allow a user to perform wireless communication in a secure, simple, and easy manner without the threat of eavesdropping or tampering even if the wireless LAN access point 55-1 is a hotspot at which no security settings such as encryption are made.

Another purpose for the information processing system 10 is to ensure the security of information being transmitted even if the information processing device 20 accidentally accesses a wireless LAN access point 55-2 provided by a malicious user intending eavesdropping or tampering of information communicated. In particular, connection to a proper communication network is established through route 2 indicated by the dashed line in FIG. 1 and therefore the data communicated through the wireless LAN access point 55-2 is encrypted and accordingly its security can be ensured.

Another purpose is to allow a user to detect that he or she is trying to connect to improper communication network, by causing mutual authentication with the VPN server 50 to fail, in the event that the information processing device 20 has accessed a false communication network or a false server intended for stealing private information about users through a wireless LAN access point 55-3.

Yet another purpose is to ensure that charges for the security of network connection are paid to an appropriate Internet service provider. That is, the VPN server 50 charges the user a fee based on the time for which the secure communication is available to the user by using a charging mechanism that charges a fee for communication by the mobile phone 30.

FIG. 2 shows a configuration of the information processing device 20. The information processing device 20 includes a short-range communication receiving unit 200, a security setting unit 210, and a second communication unit 220. The short-range communication receiving unit 200 obtains a connection program 630 for making security settings from a mobile phone 30 by short-range communication. For example, the short-range communication receiving unit 200 may obtain the connection program 630, which the mobile phone 30 has received from the registration server 40, from a mobile phone 30 by short-range wireless communication, in response to a request for connecting to a short-range wireless communication port from the mobile phone 30.

The security setting unit 210 executes the connection program 630 to set parameters required for ensuring security of the communication in the information processing device 20. For example, the security setting units 210 sets in the information processing device 20 the received connection program 630 including an ID and a password (for example setting information 650 in FIG. 7, which will be described later) associated with the relay requesting user of the information processing device 20. Then, the security setting unit 210 directs the second communication unit 220 to access the VPN server 50 through a second communication link, and performs mutual authentication with the VPN server 50 and makes security settings.

If the authentication with the VPN server 50 fails, the security setting unit 210 indicates an error message to the user to notify the authentication failure. Here, the security setting unit 210 may indicate to the user that the information communicated through the wireless LAN access point 55-1-55-3 could have been eavesdropped or tampered.

On the other hand, if the authentication with the VPN server 50 is successful, the second communication unit 220 communicates with the VPN server 50 through the unsecured, second communication link to connect to the communication network through the VPN server 50.

For example, the second communication unit 220 may perform encrypted communication with the VPN server 50 through the wireless LAN access point 55-1 to ensure the security of communications between the information processing device 20 and the VPN server 50. Alternatively, the second communication unit 220 may access a connection port provided at a place such as a hotel or an airport lounge by wire communication. In this way, security of communication can be adequately ensured even if the communication pathway to the destination is potentially unsecured.

FIG. 3 shows a configuration of a mobile phone 30. The mobile phone 30 includes a Web browser 300, a first communication unit 310, and a short-range communication transmitting unit 320. The Web browser 300 functions as a paying unit according to the present invention. In other words, the paying unit is implemented by a Web browser incorporated in most of today's mobile devices such as mobile phones. The Web browser 300 first receives an instruction, keyed in by a relay requesting user, to connect an information processing device 20 to the communication network by way of the VPN server 50. Then, the Web browser 300 performs an operation directed to the registration server 40 for paying a connection fee for connecting the information processing device 20 to the network by way of the VPN server 50.

More specifically, the Web browser 300 further receives, in association with the user, information specifying approved connection time for which the information processing device 20 is allowed to connect to the communication network by way of the VPN server 50. The Web browser 300 may also receive input of model identification information identifying the model of the information processing device 20 and send it to the registration server 40. Then, the Web browser 300 directs the first communication unit 310 to perform an operation directed to the registration server 40 for paying to the registration server 40 a fee based on the approved connection time.

Alternatively, the Web browser 300 may perform an operation for paying a fee that allows connection to the communication network in a predetermined period irrespective of how long the information processing device 20 connects to the communication network. Also, the Web browser 300 may perform an operation for paying a fee for the connection which is based on the maximum amount of data allowed to be transmitted to and from the connected communication network. Moreover, the Web browser 300 may perform an operation for changing a connection fee already paid, that is, an operation for refunding the fee or paying an additional fee. For example, the Web browser 300 may perform an operation for paying to the registration server 40 a fee based on an extended amount of approved connection time if the Web browser 300 receives an instruction to extend the approved connection time.

The model identification information may be information identifying the hardware architecture of the information processing device 20 or the operating system running on the information processing device 20 or the type or version thereof. Specifically, the model identification information may be information indicating whether the hardware is a personal computer, a PDA (Personal Digital Assistant), or a digital camera, or may be information indicating whether the operating system is Windows® XP, MacOS, Windows® CE (registered trademarks), or an OS for Palm. Also, the model identification information may be information identifying the type of VPN connection software.

Operation of the mobile phone 30 will be described below. The first communication unit 310 sends an instruction such as information specifying the approved connection time and model identification information which are received from a relay requesting user to a Web site which is provided by the registration server 40 for making security settings. When receiving these items of information, the registration server 40 performs an operation for charging the authorized user a fee based on the approved connection time and sends a mobile phone program 60 including a connection program 630 corresponding with the model identification information to the mobile phone 30. Consequently, the first communication unit 310 can access the registration server 40 and obtain the connection program 630 from the registration server 40. In addition, the first communication unit 310 may send to the registration server 40 information identifying a group to which the information processing device of the authorized user is to belong, among groups of information processing devices that communicate through the VPN server 50.

The short-range communication transmitting unit 320 executes the mobile phone program 60 to send the connection program 630 to the information processing device 20 by short-range wireless communication. The short-range wireless communication herein may be infrared data communication (IrDA) or optical communication which is performed by taking a picture of the display screen of the mobile phone 30 with a camera provided in the information processing device 20. Alternatively, the short-range wireless communication may be radiofrequency wave communication such as Bluetooth, wireless LAN, UWB (Ultra Wide Band), or wireless USB communication, or may be voice communication using a microphone and speakers.

Alternatively, the mobile phone 30 may communicate with the information processing device 20 over a cable interconnecting the information processing device 20 and the mobile phone 30 to send the connection program 630 to the information processing device 20. As yet another alternative, the mobile phone 30 may send the connection program 630 to the mobile phone 30 through a memory device (such as a SD/MMC, memory stick, CompactFlash (registered trademark), USB memory, or SIM/UIM), or a small-size magnetic medium (hard disk or flexible disk).

FIG. 4 shows a configuration of the registration server 40. The registration server 40 includes a user registering unit 400, an accounting unit 410, and a setting program transmitting unit 420. The user registering unit 400 authenticates a relay requesting user when the registration server 40 is accessed by a mobile phone 30. For example, the user registering unit 400 may authenticate the user on the basis of the caller telephone number of the mobile phone 30. If the relay requesting user is successfully authenticated, the user registering unit 400 provides identification information of the relay requesting user to the VPN server 50 to register the relay requesting user as an authorized user who is authorized to be relayed by the VPN server 50. In addition, the user registering unit 400 may register identification information of a group to which the information processing device of the authorized user is to belong, in association with the authorized user. Also, the user registering unit 400 may perform an operation for deregistering an authorized user or changing properties of an authorized user.

The accounting unit 410 performs an operation for charging an authorized user a connection fee in response to an instruction from a mobile phone 30. For example, the accounting unit 410 may notify a fee to a host computer that manages charge for calls from the mobile phone 30, in order to bill the authorized user for the connection fee along with the charge for the calls. Also, the accounting unit 410 may change the amount of a connection fee to charge the authorized user in response to an operation for changing the amount of the connection fee performed on the Web browser 300. The accounting unit 410 notifies approved connection time based on the fee to the VPN server 50.

The setting program transmitting unit 420 obtains a VPN connection ID and password from the VPN server 50 if the relay requesting user is successfully authenticated and the charging operation is completed. Then, the setting program transmitting unit 420 generates a connection program 630 including the ID and password as setting information and sends it to the information processing device 20 through the mobile phone 30. The setting program transmitting unit 420 may send a connection program 630 generated in accordance with model identification information of the information processing device 20, input from the mobile phone 30, to the mobile phone 30.

FIG. 5 shows a configuration of the VPN server 50. The VPN server 50 includes a connection request processing unit 500, an access relaying unit 510, and a connection information database (DB) 520. The connection request processing unit 500 makes security settings in response to a connection request sent from the information processing device 20 over the second communication link, if the user of the information processing device 20 is successfully authenticated as an authorized user. Preferably, the connection request processing unit 500 makes security settings if mutual authentication between the information processing device 20 and the VPN server 50 is successful. For example, the connection request processing unit 500 may make security settings after performing mutual authentication in cooperation with the registration server 40 by using the ID and password of the relay requesting user through challenge and response.

The access relaying unit 510 determines whether access from the authorized user of the information processing device 20 identified with the connection request to the VPN server 50 is within the limit of approved connection which is determined by the connection fee paid by the authorized user. It should be noted that if the connection fee is changed from the Web browser 300, the access relaying unit 510 determines whether the access is within the limit of approved connection determined by the changed connection fee. If within the limit of approved connection, the access relaying unit 510 relays the access from the information processing device 20 to the communication network. Otherwise, the access relaying unit 510 does not relay the access from the information processing device 20 to the communication network.

Specifically, the access relaying unit 510 may perform the following operation. The access relaying unit 510 retrieves the approved connection time, which is an example of the limit of approved connection, from the connection information DB 520 if the user is successfully authenticated. When the connection request processing unit 500 receives a connection request, the access relaying unit 510 identifies the authorized user from the ID included in the connection request. If the amount of connection time used by the identified authorized user accessing the VPN server 50 is within the approved connection time for the user, the access relaying unit 510 relays the access from the information processing device of the user to the communication network. On the other hand, if the amount of connection time used by the identified authorized user accessing the VPN server 50 exceeds the approved connection time for the user, the access relaying unit 510 does not relay the access from the information processing device of the user to the communication network.

Alternatively, if the fee paid is a fee that allows access to the communication network during a predetermined period irrespective of the amount of connection time, the access relaying unit 510 may determine whether the access by the authorized user to the VPN server 50 is performed within that predetermined period. As another alternative, if the fee paid is a fee based on the maximum amount of data allowed to be transmitted to and from the communication network connected, the access relaying unit 510 may determine whether the access by the authorized user to the VPN server 50 is within that maximum amount.

If a number of payment modes, as described above, that determine the limit of approved connection can be set, the Web browser 300 may perform an operation for changing the mode that determines the limit of approved connection in response to an instruction from the user. In that case, the access relaying unit 510 of the VPN server 50 determines whether to relay access from the information processing device 20 to the communication network on the basis of the limit of approved connection determined by the changed mode.

The access relaying unit 510 may permit access for referring from one information processing device in a group to another information processing device in the same group, among a number of groups of information processing devices that connect to the communication network through the VPN server 50. On the other hand, the access relaying unit 510 may prohibit access for referring from an information processing device in a group to another information processing device in another group. This makes it possible for a user to select only information processing devices to share data, and to treat them as if they were on the same LAN.

FIG. 6 shows an exemplary data structure of the connection information DB 520. The connection information DB 520 stores authentication information for authenticating authorized users in association with IDs identifying the authorized users and group IDs of groups to which the information processing devices of the authorized users belong. The connection information DB 520 also stores the cumulative time for which each authorized user has connected to the VPN server 50 associated with the authorized user ID, in association with the user's approved connection time.

The authorized user ID may be a login ID for logging in the VPN server 50. The authentication information may be a password for logging in the VPN server 50 or an encryption key of the authorized user. The group ID may be a VLAN-ID specified in IEEE 802.1Q. The VLAN-ID may be statically assigned or may be dynamically registered by a request from the authorized user.

The connection information DB 520 adds or updates these items of information in accordance with notification provided from the registration server 40 in response to a request from a mobile phone 30. In addition, the connection information DB 520 may reregister extended connection time according to an instruction from the first communication unit 310.

According to the authentication information provided in FIG. 6, the connection request processing unit 500 can perform mutual authentication appropriate for each individual authorized user. Furthermore, according to connection time and approved connection time provided in FIG. 6, the access relaying unit 510 can properly control whether to permit each authorized user access. Moreover, with the group IDs provided in FIG. 6, the access relaying unit 510 can properly determine whether to permit access for referring from an information processing device to another information processing device.

Because approved connection time is managed on an authorized-user-by-user basis (for example by login ID), once a mobile phone program 60 is downloaded to the user's mobile phone 30, the user can distribute the program 60 to a number of information processing devices and can access from the information processing devices to the VPN server 50 sequentially or concurrently. This saves mobile phone call charges for the user and is also convenient for the user because once the user obtains the mobile phone program 60, the user does not have to use the mobile phone anymore for that purpose.

FIG. 7 shows a specific example of the mobile phone program 60. The mobile phone program 60 includes a transmission program 600 and an information processing device program 610. After being obtained by a mobile phone 30, the transmission program 600 is executed automatically and sends the information processing device program 610 from the mobile phone 30 to an information processing device 20. That is, after the mobile phone program 60 is obtained, the short-range communication transmitting unit 320 sends the information processing device program 610 to the information processing device 20 in response to execution of the transmission program 600. Specifically, the transmission program 600 may be a Java® (registered trademark) applet, an i-application, or a BREW application, that is executable on the mobile phone 30.

The information processing device program 610 includes a setting program, and various items of data such as VPN setting parameters as a single file. For example, the information processing device program 610 includes a decompression/activation program 620 and a connection program 630. The decompression/activation program 620 is an executable program (for example in EXE format) that decompresses the connection program 630 and activates the VPN setting program 640. The connection program 630 includes the VPN setting program 640 and setting information 650, which are compressed by a data compression program.

The setting information 650 includes security setting parameters. For example, the setting information 650 includes an ID and a password which are established between an information processing device 20 and the VPN server 50 when the registration server 40 successfully authenticates a relay requesting user. The setting information 650 may also include connection communication information, such as the IP address of the VPN server 50, required for connecting to the VPN server 50.

The VPN setting program 640 is an executable program which can be executed on the information processing device 20 and sets setting information 650 on the information processing device 20. For example, the VPN setting program 640 may set setting parameters included in the setting information 650, for PPTP (Point-to-Point Tunneling Protocol), which is a VPN communication program provided as a function of Windows® (registered trademark) operating systems, or IPsec (Security Architecture for Internet Protocol). In addition to setting parameters for IPsec, the VPN setting program 640 may rewrite a routing table used by the information processing device 20 for routing communication packets. Alternatively, the VPN setting program 640 may include a communication program itself that communicates with the VPN server 50.

FIG. 8 shows an exemplary display presented on the display screen of a mobile phone 30. The Web browser 300 displays an option for making security settings for a second communication link in the initial menu presented when the mobile phone 30 is used for the first time. When the security setting option is selected by the user, the first communication unit 310 accesses a registration server 40, which is an official site of the mobile communications provider for the mobile phone 30, through the telephone network. As a result, the mobile phone 30 presents the display shown in FIG. 8. If the mobile phone 30 is connected to an expansion slot of the information processing device 20, the displays that would be displayed on the mobile phone 30 may be displayed on the information processing device 20. In such a case, mobile phone 30 may be operated by key entries for on the information processing device 20.

Specifically, the Web browser 300 presents fees based on the amounts of approved connection times for which the information processing device 20 is allowed to connect to the communication network through the VPN server 50, as icons of prepaid cards to the user. If the user selects the icon of 500 yen by key entries, the Web browser 300 performs an operation for paying a fee of 500 yen. Then, the registration server 40 notifies the approved connection time equivalent to an amount of 500 yen to the VPN server 50. The first communication unit 310 obtains the mobile phone program 60 from the registration server 40.

FIG. 9 shows an example of a process performed on an information processing device 20 for starting communication with the VPN server 50. When the short-range communication receiving unit 200 receives a connection request from a mobile phone 30 by short-range wireless communication (S800: YES), the short-range communication receiving unit 200 obtains the information processing device program 610 from the mobile phone 30 (S810). After the short-range communication receiving unit 200 receives the information processing device program 610 and obtains the connection program 630 from the mobile phone 30 (S820: YES), an icon for activating the connection program 630 is displayed on the desktop of a window system (S830). When the icon is clicked and the connection program 630 is executed (S840: YES), the security setting unit 210 makes security settings, for example, VPN settings (S850). In this way, once the connection program 630 has been obtained, its icon is displayed on the screen. Therefore, after the user discontinues the communication, the user can subsequently restart communication simply by clicking the icon.

The security setting unit 210 accesses the VPN server 50 through the second communication link, performs mutual authentication with the VPN server 50, and makes security settings. For example, the security setting unit 210 may use MS-CHAP V2 (Microsoft Challenge Handshake Authentication Protocol version 2) to perform the mutual authentication with the VPS server 50. If the mutual authentication fails (S860: NO), the security setting unit 210 displays a warning display indicating the error to the user (S870). On the other hand, if the mutual authentication is successful (S860; YES), the second communication unit 220 communicates with the VPN server 50 through the unsecured, second communication link to ensure the security of connection to the communication network (S880).

Because the communication between the information processing device 20 and the VPN server 50 is secured in this way with encryption, for example, the user can perform secure communication even if communication between the wireless LAN access point 55-1 and the information processing device 20 is not encrypted with an encryption scheme such as WEP. Furthermore, leakage of data transmitted can be prevented even if the information processing device 20 accidentally connects through a wireless LAN access point 55-2 where there is potential threat of eavesdropping or tampering.

FIG. 10 shows an example of a process performed on a mobile phone 30 for obtaining a mobile phone program 60 and sending it to an information processing device 20. When an option for displaying a registration page for applying for VPN connection is selected from the initial menu by a relay requesting user by key entries, the first communication unit 310 displays the registration page for applying for VPN connection (S900). Specifically, the first communication unit 310 displays prepaid cards based on the amount of approved connection times, as shown in FIG. 8.

Then, if an operation for purchasing a prepaid card (for example an operation for paying a fee) performed through the Web browser 300 succeeds, the first communication unit 310 sends model identification information identifying the model of the information processing device 20 to the registration server 40 through the first communication link (S920). For example, the first communication unit 310 may send the model identification information keyed in by the relay requesting user to the registration server 40. The first communication unit 310 may also send to the registration server 40 information that specifies a group to which the information processing device 20 is to belong in response to an instruction from the relay requesting user (S925). This will be detailed later with respect to FIG. 14.

Then, the first communication unit 310 downloads a mobile phone program 60 dependent on the model identification information from the registration server 40 and saves it in a non-volatile memory (S930). Then, the short-range communication transmitting unit 320 determines whether short-range wireless communication is enabled (S940). For example, the short-range communication transmitting unit 320 may determine whether short-range wireless connection is established between the information processing device 20 and the mobile phone 30.

If the short-range wireless communication is enabled (S940: YES), the short-range communication transmitting unit 320 makes settings for starting short-range wireless communication in the communication interface (S960) and transmits an information processing device program 610 to the information processing device 20 (S970). Preferably, a message is displayed on the display after the completion of the transmission.

FIG. 11 shows an example of a process performed on the registration server 40 for sending a mobile phone program 60 to a mobile phone 30. If the registration server 40 successfully authenticates a relay requesting user on the basis of the caller number of the mobile phone 30 or the unique number, such as the serial number, of the mobile phone 30, the registration server 40 performs the following process. After the registration server 40 receives access to a registration page for applying for VPN connection on its official site from the mobile phone 30 (S1000: YES), the registration server 40 determines whether it has received a request for purchasing a prepaid card for approved connection time (S1010).

If it has received the purchase request (S1010: YES), the user registering unit 400 provides charging information indicating a fee charged to the relay requesting user according to the approved connection time to the VPN server 50 (S1030). The user registering unit 400 may also provide the caller telephone number of the relay requesting user to the VPN server 50. The user registering unit 400 can register the authorized user in the connection information DB 520.

Then, the setting program transmitting unit 420 receives setting information 650 generated on the basis of information such as the caller telephone number from the VPN server 50 (S1040). The setting program transmitting unit 420 then generates an information processing device program 610 by combining the setting information 650 with a connection program 630 which is determined according to model identification information and then generates a mobile phone program 60, which is an executable file consisting with the information processing device program combined with a transmission program 600 (S1050). Then, the setting program transmitting unit 420 sends the mobile phone program 60 to the mobile phone 30 (S1060).

FIG. 12 shows an example of a process performed on the VPN server 50 for sending setting information 650 to the registration server 40 in response to notification from the registration server 40. When receiving information such as charging information and the caller telephone number or unique number of a mobile phone 30 from the registration server 40, the connection request processing unit 500 generates an ID and a password corresponding to the caller telephone number (S1100). The connection request processing unit 500 may receive a credit card number of the user, the serial number of the mobile phone 30, or the MAC address of the information processing device 20, instead of the caller telephone number, from the registration server 40.

Then, the connection request processing unit 500 generates setting information 650 including the generated ID and password (S110) and sends it to the registration server 40 (S1120). The process shown in FIG. 12 may be performed by a management server provided separately from the VPN server 50 for managing the users who connect to the VPN server 50.

FIG. 13 shows an example of a process performed on the VPN server 50 for relaying access from an information processing device 20 to the communication network. When the connection request processing unit 500 receives a connection request from an information processing device 20 through a second communication link (S1200), the connection request processing unit 500 authenticates the information processing device 20. If the authentication is successful (S1210: YES), the connection request processing unit determines whether the connection time used by the relay requesting user is less than or equal to the approved connection time for the relay requesting user (S1220).

If the connection time does not exceed the approved connection time (S1220: YES), the access relaying unit 510 relays the access from the user's information processing device to the communication network (S1240). On the other hand, if the connection time exceeds the approved connection time (S1220: NO), the access relaying unit 510 notifies the information processing device 20 that the information processing device 20 cannot be connected because the cost of the access will exceed the fee paid. If the access relaying unit 510 has already relayed the access to the communication network, access relaying unit 510 may disconnect the information processing device 20 from the VPN server 50.

FIG. 14 is a diagram illustrating the concept of grouping of information processing devices. In the example shown in FIG. 14, the information processing system 10 includes mobile phones 30-1-30-3 owned by different users and information processing devices 20-1-20-4. Information processing devices 20-1 and 20-2 are used by the user of mobile phone 30-1 or a person permitted by that user to connect to the VPN server 50. Information processing device 20-3 is used by the user of mobile phone 30-2 or a person permitted by that user to connect to the VPN server 50. Information processing unit 20-4 is used by the user of mobile phone 30-3 or a person permitted by that user to connect to the VPN server 50.

Mobile phone 30-1 obtains a mobile phone program 60-1 from the registration server 40. The mobile phone 30-1 then sends an information processing device program 610-1 included in the mobile phone program 60-1 to information processing devices 20-1 and 20-2. As a result, the same setting information is set in information processing devices 20-1 and 20-2. The setting information is denoted by reference numeral 650-1. If the setting information 650-1 is set in both of information processing devices 20-1 and 20-2, the access relaying unit 510 of the VPN server 50 permits access for information processing devices 20-1 and 20-2 to refer to each other. In this way, the VPN server 50 treats multiple information processing devices in which security settings are made by the same setting program as belonging to the same group. Accordingly, the multiple information processing devices used by the same authorized user can readily send and receive information to and from one another.

Mobile phone 30-2 sends the telephone number of mobile phone 30-3, "090-XXXX-XXX2", to the registration server 40 as information specifying a group to which information processing device 20-3 is to belong. Mobile phone 30-2 obtains mobile phone program 60-2 from the registration server 40. Then, mobile phone 30-2 sends information processing device program 610-2 included in mobile phone program 60-2 to the information processing device 20-3. As a result, setting information 650-2 is set in the information processing device 20-3.

Mobile phone 30-3 sends the telephone number of mobile phone 30-2, "090-XXXX-XXX1", to the registration server 40 as information specifying a group to which information processing device 20-4 is to belong. Mobile phone 30-3 obtains mobile phone program 60-3 from the registration server 40. Then, mobile phone 30-3 sends information processing device program 610-3 included in mobile phone program 60-3 to information processing device 20-4. As a result, setting information 650-3 is set in the information processing device 20-3.

The registration server 40 receives the telephone number of mobile phone 30-3 as information specifying the group from the mobile phone 30-2. The registration server 40 also receives the telephone number of mobile phone 30-2 as information specifying the group from the mobile phone 30-3. Because the telephone numbers of both mobile phones 30-2 and 30-3 are specified, the registration server 40 includes information processing devices 20-3 and 20-4 in the same group. Specifically, when the telephone numbers of both mobile phones are specified, the user registering unit 400 of the registration server 40 may generate a new group ID, associate it with each authorized user's ID, and register the IDs in the connection information DB.

In this way, when a number of authorized users specify one another's identification information (telephone numbers in the example shown in FIG. 14), the user registering unit 400 of the registration server 40 includes the information processing devices in which security settings are made by a setting program sent to the mobile phones of the authorized users in the same group. In this way, even if a setting program is downloaded by different mobile phones, any set of information processing devices can be included in the same group, provided that successful mutual authentication is performed.

FIG. 15 shows an exemplary hardware configuration of a computer 700 that functions as the registration server 40. The computer 700 includes a CPU section including a CPU 1000, a RAM 1020, and a graphic controller 1075 interconnected through a host controller 1082, an input-output section including a communication interface 1030, a hard disk drive 1040, and a CD-ROM drive 1060, which are connected to the host controller 1082 through an input-output controller 1084, and a legacy input-output section including a BIOS 1010, a flexible disk drive 1050, an input-output chip 1070, which are connected to the input-output controller 1084.

The host controller 1082 connects the RAM 1020 with the CPU 1000 and the graphic controller 1075, which access the RAM 1020 at higher transfer rates. The CPU 1000 operates according to programs stored in the BIOS 1010 and the RAM 1020 to control components of the computer. The graphic controller 1075 obtains image data generated by the CPU 1000 on a frame buffer provided in the RAM 1020 and causes it to be displayed on a display device 1080. Alternatively, the graphic controller 1075 may contain a frame buffer for storing image data generated by the CPU 1000.

The input-output controller 1084 connects the host controller 1082 with the communication interface 1030, the hard disk drive 1040, and the CD-ROM drive 1060, which are relatively fast input/output devices. The communication interface 1030 communicates with external devices through a network. The hard disk drive 1040 stores programs and data used by the computer 700. The CD-ROM drive 1060 reads a program or data from a CD-ROM 1095 and provides it to the input-output chip 1070 through the RAM 1020.

Also connected to the input-output controller 1084 are relatively slow input/output devices such as the BIOS 1010, the flexible disk drive 1050, and the input-output chip 1070. The BIOS 1010 stores a boot program executed by the CPU 1000 during boot-up of the computer 700 and programs dependent on the hardware of the computer 700. The flexible disk drive 1050 reads a program or data from a flexible disk 1090 and provides it to the input-output chip 1070 through the RAM 1020. The input-output chip 1070 connects the flexible disk 1090, and various input/output devices through ports such as a parallel port, serial port, keyboard port, and mouse port, for example.

A program to be provided to the computer 700 is stored on a recording medium such as a flexible disk 1090, a CD-ROM 1095, or an IC card and provided by a user. The program is read from the recording medium and installed in the computer 700 through the input-output chip 1070 and/or input-output controller 1084 and executed in the computer 700.

The read program may be provided to information processing devices 20, mobile phones 30, or the VPN server 50 over the network and executed in the information processing devices 20, mobile phones 30, or the VPN server 50. The program executed on the information processing devices 20, mobile phones 30, registration server 40, or the VPN server 50 causes the computer 700 to perform the same operations in the information processing devices 20, mobile phones 30, registration server 40, or VPN server 50 that have been described with reference to FIGS. 1 to 14, therefore the description of which is omitted.

The program described above may be stored in an external storage medium. The storage medium may be a flexible disk 1090 or a CD-ROM 1095, or an optical recording medium such as a DVD and PD, a magneto-optical recording medium such as an MD, a tape medium, or a semiconductor memory such as an IC card. Alternatively, a storage device such as a hard disk or a RAM provided in a server system connected to a private communication network or the Internet may be used as the recording medium and the programs may be provided from the storage device to the computer 700 over the network.

With the information processing system 10 in the present embodiments, a setting program that makes settings for performing secure communication through a potentially unsecured communication link can be obtained through a secure telephone line beforehand. Thus, secure communication can be performed by using access points such as hotspots provided in public places at which security settings such as encryption are not made, without requiring complicated operations by the user.

While the present invention has been described with respect to embodiments thereof, the technical scope of the present invention is not limited to that described with the embodiments. It will be apparent to those skilled in the art that various modifications or improvements can be made to the embodiment. It will be apparent from the claims that embodiments to which such modifications and improvements are made also fall within the scope of the technical scope of the present invention.

What is claimed is:

1. An information processing system including a mobile phone, an information processing device, a relay server which relays access from the information processing device to a communication network, and a registration server which registers a user who uses the relay server, according to an instruction from the mobile phone, the mobile phone comprising:
  a first communication unit which accesses the registration server through a first communication link which is a secured communication link and obtains from the registration server a setting program which performs authentication with a communication destination on a potentially unsecured communication link and makes security settings for ensuring security of communication; and
  a short-range communication transmitting unit which sends the setting program to the information processing device by short-range communication;

the information processing device comprising:
  a short-range communication receiving unit which obtains the setting program from the mobile phone;
  a security setting unit which executes the setting program to perform authentication with the relay server through a second communication link which is a potentially unsecured communication link and to make the security settings; and
  a second communication unit which communicates with the relay server through the second communication link to connect to the communication network if the security settings are made;

the registration server comprising:
  a user registering unit which registers, on the basis of access from the mobile phone, an authorized user authorized to be relayed by the relay server; and
  a setting program transmitting unit which sends to the mobile phone the setting program for the authorized user to make the security settings on the information processing device; and the relay server comprising:
  a connection request processing unit which makes the security settings, provided that a connection request from the information processing device is received through the second communication link and that the user of the information processing device is authenticated as the authorized user; and
  an access relaying unit which relays access from the information processing device to the communication network if the security settings are made.

2. The information processing system according to claim 1, wherein:
  the setting program transmitting unit sends the setting program to the mobile phone, the setting program being put in a mobile phone program which is executable on the mobile phone and is to be downloaded and executed by the mobile phone; and the short-range communication transmitting unit sends the setting program to the information processing device by executing the mobile phone program.

3. The information processing system according to claim 1, wherein:

the mobile phone further comprises a paying unit for performing an operation directed to the registration server for paying a connection fee for connecting the information processing device to the communication network by way of the relay server;

the registration server further comprises an accounting unit for charging to the authorized user the connection fee according to an instruction from the mobile phone; and the access relaying unit relays access from the information processing device to the connection network if connection to the relay server by the authorized user of the information processing device which is determined according to the connection request is within the limit of approved connection which is based on the connection fee paid by the authorized user, or does not relay access from the information processing device to the communication network if the connection exceeds the limit of approved connection for the authorized user.

4. The information processing system according to claim 3, wherein:

the paying unit further performs an operation for changing the connection fee for which an operation for paying has been performed;

the accounting unit changes a charge on the authorized user according to a change to the connection fee; and the access relaying unit determines whether access to the communication network is to be relayed or not, on the basis of the connection fee changed by the paying unit.

5. The information processing system according to claim 3, wherein:

the paying unit performs an operation for changing the mode that determines the limit of approved connection based on the connection fee paid; and the access relaying unit determines whether or not access from the information processing device is to be relayed to the communication network, on the basis of a changed limit of the approved connection if the mode that determines the limit of approved connection is changed.

6. The information processing system according to claim 1, further comprising a wireless LAN access point which connects the information processing device to the relay server by communicating wirelessly with the information processing device; wherein the second communication unit performs encrypted communication with the relay server through the wireless LAN access point.

7. The information processing system according to claim 1, wherein:

the first communication unit sends model identification information identifying the model of the information processing device to the registration server; and the setting program transmitting unit generates a setting program corresponding with the model identification information of the information processing device and sends the setting program to the information processing device.

8. The information processing system according to claim 1, wherein:

the user registering unit registers identification information of a group to which an information processing device of an authorized user is to belong in association with the authorized user; and the access relaying unit permits access for referring from one information processing device to another information processing device in the same group but prohibits access for referring from one information processing device in a group to another information processing device in another group.

9. The information processing system according to claim 8, wherein the user registering unit classifies into the same group a plurality of information processing devices in which the security settings have been made by a setting program sent to mobile phones of a plurality of authorized users, if the plurality of authorized users specify identification information of one another's mobile phones.

10. The information processing system according to claim 1, wherein the access relaying unit permits access for referring from one information processing device to another information processing device in which the security settings are made by the same setting program, but prohibits access for a plurality of information processing devices in which security settings are made by different setting programs to refer to one another.

11. A communication method in an information processing system including a mobile phone, an information processing device, a relay server which relays access from the information processing device to a communication network, and a registration server which registers a user who uses the relay server, according to an instruction from the mobile phone, the method comprising:

steps performed by the mobile phone, comprising, a first communication step of accessing the registration server through a first communication link which is a secured communication link and obtaining from the registration server a setting program which performs authentication with a communication destination on a potentially unsecured communication link and makes security settings for ensuring security of communication; and a short-range communication transmitting step of sending the setting program to the information processing device by short-range communication;

steps performed by the information processing device, comprising:

a short-range communication receiving step of obtaining the setting program from the mobile phone;

a security setting step of executing the setting program to perform authentication with the relay server through a second communication link which is a potentially unsecured communication link and to make the security settings; and a second communication step of communicating with the relay server through the second communication link to connect to the communication network if the security settings are made;

steps performed by the registration server, comprising:

a user registering step of registering, on the basis of access from the mobile phone, an authorized user authorized to be relayed by the relay server; and a setting program transmitting step of sending to the mobile phone the setting program for the authorized user to make the security settings on the information processing device; and the relay server comprising:
- a connection request processing step of making the security settings, provided that a connection request from the information processing device is received through the second communication link and that the user of the information processing device is authenticated as the authorized user; and
- an access relaying step of relaying access from the information processing device to the communication network if the security settings are made.

12. A product comprising:
a computer usable medium having computer readable program code stored therein for causing a computer system to function as an information processing system including a mobile phone, an information processing device, a relay server which relays access from the information processing device to a communication network, and a registration server which registers a user who uses the relay server, according to an instruction from the mobile phone, the computer readable program code in said product causing the mobile phone to function as:
- a first communication unit which accesses the registration server through a first communication link which is a secured communication link and obtains from the registration server a setting program which performs authentication with a communication destination on a potentially unsecured communication link and makes security settings for ensuring security of communication; and
- a short-range communication transmitting unit which sends the setting program to the information processing device by short-range communication;

the program causing the information processing device to function as:
- a short-range communication receiving unit which obtains the setting program from the mobile phone;
- a security setting unit which executes the setting program to perform authentication with the relay server through a second communication link which is a potentially unsecured communication link and to make the security settings; and
- a second communication unit which communicates with the relay server through the second communication link to connect to the communication network if the security settings are made;

the program causing the registration server to function as:
- a user registering unit which registers, on the basis of access from the mobile phone, an authorized user authorized to be relayed by the relay server; and
- a setting program transmitting unit which sends to the mobile phone the setting program for the authorized user to make the security settings on the information processing device; and the program causing the relay server to function as:
- a connection request processing unit which makes the security settings, provided that a connection request from the information processing device is received through the second communication link and that the user of the information processing device is authenticated the authorized user; and
- an access relaying unit which relays access from the information processing device to the communication network if the security settings are made.

13. An access relaying service system including a relay server which relays access from an information processing device to a communication network and a registration server which registers a user who uses the relay server, according to an instruction from a mobile phone, the registration server comprising:
- a user registering unit which registers an authorized user authorized to be relayed by the relay server, on the basis of access received from the mobile phone through a first communication link which is a secured communication link; and
- a setting program transmitting unit which sends to the mobile phone a setting program for the authorized user, the setting program performing authentication with a communication destination on a potentially unsecured communication link and making security settings for ensuring security of communication; and the relay server comprising:
- a connection request processing unit which makes the security setting, provided that a connection request from the information processing device on which the security setting program has been executed is received through a second communication link which is a potentially unsecured communication link and that the user of the information processing device is authenticated as the authorized user; and
- an access relaying unit which relays access from the information processing device through the second communication link to the communication network, if the security settings are made.

* * * * *